US005611620A

United States Patent [19]

Wantz

[11] Patent Number: 5,611,620

[45] Date of Patent: Mar. 18, 1997

[54] METHOD AND APPARATUS FOR TESTING HEAT DETECTORS

[75] Inventor: James C. Wantz, Mesa, Ariz.

[73] Assignee: Leon Cooper, Malibu, Calif.

[21] Appl. No.: 365,933

[22] Filed: Dec. 29, 1994

[51] Int. Cl.[6] .......................... G08B 29/00; G01K 15/00

[52] U.S. Cl. .................................... 374/1; 340/515

[58] Field of Search .......................... 374/1; 340/514, 340/515; 126/263.05, 263.02; 252/67; 44/252, 253

[56] References Cited

U.S. PATENT DOCUMENTS

| | | | |
|---|---|---|---|
| 4,518,952 | 5/1985 | Tanaka et al. | 340/515 |
| 4,649,895 | 3/1987 | Yasuki et al. | 252/67 |
| 4,827,244 | 5/1989 | Bellavia et al. | 340/515 |
| 4,859,075 | 8/1989 | Sutter, Jr. et al. | 340/515 |
| 5,170,148 | 12/1992 | Duggan et al. | 340/515 |

*Primary Examiner*—Diego F. F. Gutierrez
*Attorney, Agent, or Firm*—Natan Epstein

[57] ABSTRACT

A method and apparatus for safely and conveniently testing heat detectors mounted at an elevated location above a ground surface. A package containing a composition formulated to react exothermically but non-flammably upon exposure to ambient air sustains a temperature sufficient to activate the heat detectors under feet for a period of at least a few minutes. The package is placed in a holder supported on a long handle for raising the package into close proximity to the heat detector. After initiating the exothermic reaction, as by tearing an envelope containing the reactive composition, an operator standing on the ground under the heat detector elevates the package into contact with or close proximity to the heat detector.

14 Claims, 1 Drawing Sheet

Fig. 1
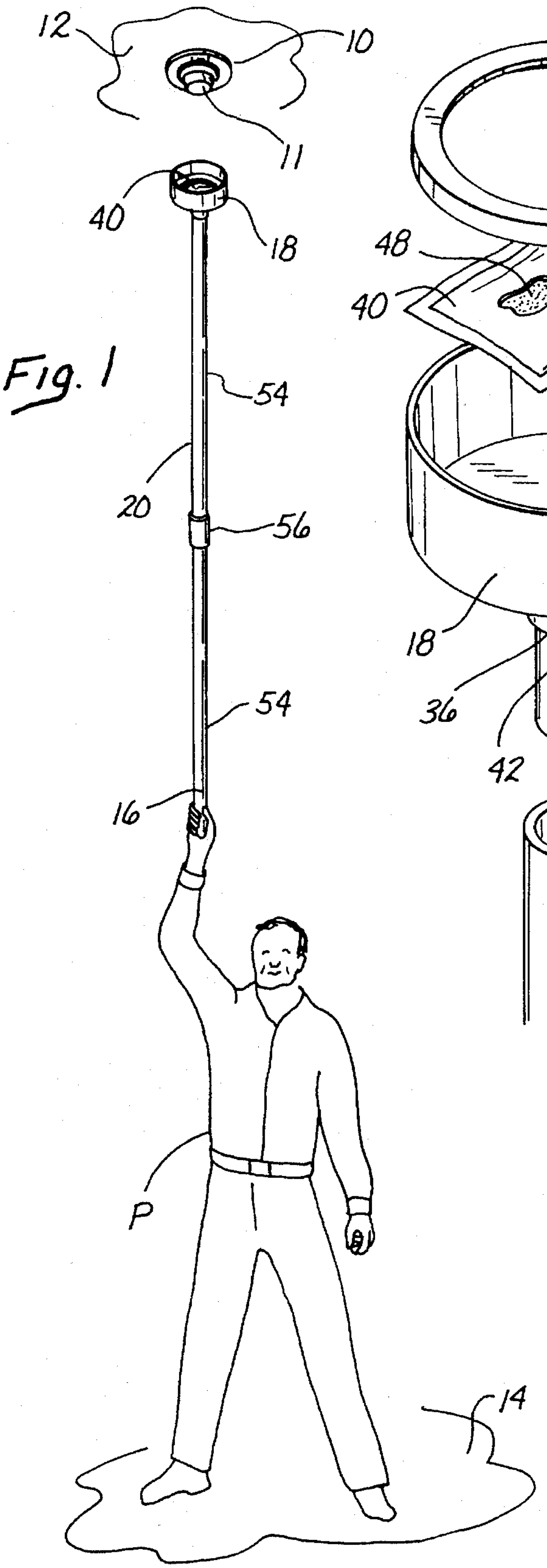
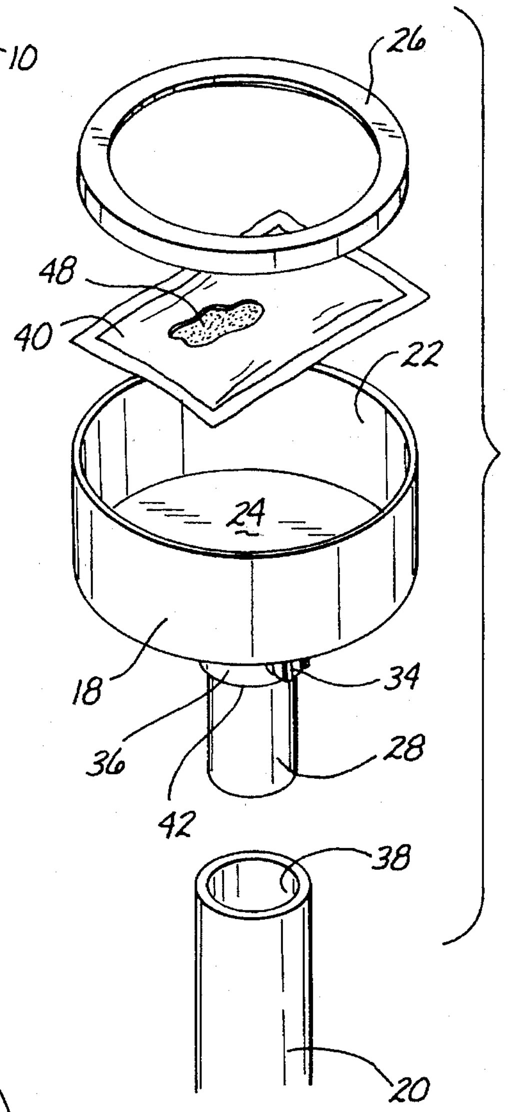
Fig. 2
Fig. 3
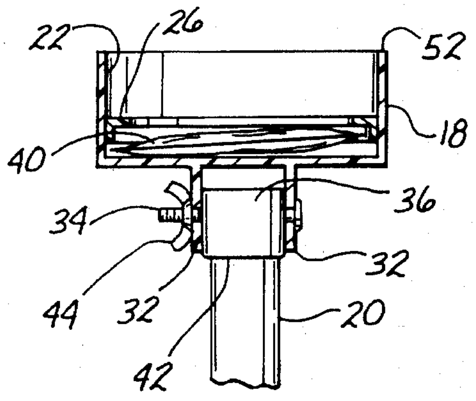

METHOD AND APPARATUS FOR TESTING HEAT DETECTORS

BACKGROUND OF THE INVENTION

1 . Field of the Invention

This invention generally pertains to the field of fire alarms and detectors and more particularly concerns a method and apparatus for conveniently testing the operation of heat detector alarm installations.

2 . Background of the Invention

Early warning of fire in residential and commercial buildings has been proven to save numerous lives every year and has become a matter of national concern. For this purpose several different types of fire alarm systems are in use, designed to meet the requirements of various kinds of installations. Residential installations typically rely upon smoke detectors, which respond to the presence of air borne smoke particles generated in the early stages of combustion. However, smoke detectors can be unreliable in commercial and industrial environments due to the presence of other airborne materials, vapors and dusts produced in the normal course of commercial and industrial activity and which can falsely activate smoke detectors. Many commercial and industrial installations therefore depend upon heat detectors which are activated by certain changes in temperature indicative of a possible fire.

Most modern heat detectors incorporate either the rate of rise principle of operation or are of the rate compensated type. Each such type of detector is capable of sensing not simply the existence of an elevated temperature, but rather the rate of rise of the temperature of the air surrounding the detector so long as this rate exceeds preset limits. The temperature of air near a ceiling tends to rise rapidly in the event of a fire, and heat detectors incorporating the rate of rise or rate compensation feature are designed to respond to such rapid rise in temperature in order to discriminate against more gradual temperature increases unrelated to conflagrations. Rate compensated heat detectors, on the other hand, are a combination of fixed temperature and rate anticipation detector i.e., they activate an alarm simply upon reaching a given temperature during slow heat rise. During rapid heat rise, however, they are designed to account for the temperature lag between the detector temperature and air temperature. The temperature of the heat detector unit always lags behind the rising temperature of the surrounding air. This is because it takes a certain amount of time for heat transfer to occur from the ambient air to the heat sensor unit. The extent of this lag depends on how quickly the air temperature is rising, the lag being greater for a faster temperature rise of the air. Rate compensated heat detectors are constructed to compensate for this temperature lag, so as to trigger an alarm at a lower detector temperature if the temperature of the detector is rising rapidly, and trigger the alarm at a higher detector temperature if the rate of rise is slower.

Rate compensation detectors respond when the temperature of the air surrounding the device reaches a predetermined level, if the temperature rise is of a rate less than 5 degrees F/minute, and responds quickly thus eliminating temperature lag when the air temperature rise exceeds 5 degrees F/minute. A rate of rise detector, by contrast, responds when the detector temperature rises at a rate greater than 15 degrees F/minute but does not operate if the temperature rise is slower than 15 degrees F/minute. Some rate of rise heat detectors are combined with a fixed temperature detector. The fixed temperature portion of the combined rate of rise/fixed temperature heat detectors is sometimes activated by a fusible link made of a eutectic material, which can be a metallic alloy characterized by a low melting point. The eutectic alloy is selected to melt at the desired fixed temperature, and may be installed in such a way that an electrical circuit is closed when the fusible element melts. For example, a spring element can be held in a stretched condition so that upon melting of the eutectic element, the spring is released into contact with a second element to make an electrical connection. Eutectic alloy sensors are one shot devices, and must be replaced if once activated. Other models use a bi-metal arrangement which changes shape causing a contact closure at the desired temperature. Such detectors are self-restoring and so are reusable.

The various types of heat detectors are each available in several temperature ratings, designed to respond at different temperature ranges. The temperature classifications include the Low temperature range from 100 to 134 degrees Fahrenheit, the ordinary temperature range from 135 to 174 degrees Fahrenheit, the Intermediate range from 175 to 249 degrees, and several still higher temperature ranges. The great majority of heat detectors currently in use, however, fall within the Ordinary temperature range, i.e. they activate at about 135 degrees Fahrenheit.

Each heat detector has a radius of effective coverage. This radius varies from one heat detector model to another, and typically is between 25 feet and 50 feet. A typical installation requires a number of heat detectors installed in a grid pattern on the ceiling of the structure to be protected. The spacing between the detectors is determined by the effective coverage capability of each unit. A large commercial or industrial space, such as a warehouse, may have a considerable number of heat detectors. Furthermore, such spaces commonly have high ceilings, which places the heat detectors out of easy reach.

At present, only makeshift methods exist for the operational testing of heat detectors, if such testing is done at all. Commonly employed heat sources include the use of hair dryers, heat guns and heat lamps. A ladder must be placed under each heat detector and the heat source is hand carried up the ladder to test the detector. Long extension cords are typically required by this approach. Clearly, this is a cumbersome, time consuming and ineffective approach to the testing of heat detectors, with the result that too often heat detectors go untested over extended periods, in spite of annual testing requirements by industrial and commercial codes.

A need exists for an efficient and reliable method for testing heat detector installations.

SUMMARY OF THE INVENTION

This invention addresses the aforementioned need by providing a method for testing heat detectors mounted at an elevated location above a ground surface. The novel method is practiced by providing a package containing a composition formulated to react exothermically but non-flammably so as to sustain a temperature of the composition sufficient to activate the heat detector or detectors under test, and to sustain such a temperature for a period of at least a few minutes upon exposure to ambient air. The contents of the package are exposed to ambient air in order to initiate the exothermic reaction, and the package is elevated into contact with or close proximity to each heat detector to be tested.

Elevation of the package is preferably done with the aid of a substantially rigid extension having a handle end and a holder at an opposite end. The heat generating package is placed in the holder, and the extension is raised to bring the holder with the package into contact with or close proximity to each heat detector by an operator standing on a ground surface under the heat detector. Preferably, the package is secured to the holder to keep the package from falling away from the holder. The package may be enclosed in an initially air tight envelope and the composition is exposed to ambient air by tearing open the envelope.

The composition in the package may include finely powdered iron oxide and formulated to sustain a temperature in the range of 110 to about 160 degrees Fahrenheit for at least a few minutes upon exposure to ambient air. The holder on the extension may be cup shaped with an open end defined by a cup wall, a cup bottom fixed to the extension, and a retainer for securing the package within the cup. The open end may be circular and the cup shape may have a frustro-cylindrical inner wall. The retainer can be dimensioned to make a friction fit in the cup in spaced relationship to the cup bottom so as to contain the heating package therebetween. The extension is preferably a tubular pole of relatively lightweight material, and can be made up of sections, such as two foot long sections, of lightweight tubing separably joined together to make up a sufficient length to reach the ceiling mounted heat detectors.

BRIEF DESCRIPTION OF THE DRAWINGS

FIG. 1 illustrates the testing of a heat detector by lifting a heat emitting package in a cup holder on an extension pole into proximity to a ceiling mounted heat detector by an operator standing on a ground surface;

FIG. 2 is an exploded perspective view of the heat package holding end of the extension pole;

FIG. 3 shows the heat package holder of the extension pole, with the holder seen in diametric section.

DETAILED DESCRIPTION OF THE PREFERRED EMBODIMENTS

With reference to the drawings in which like numerals designate like elements, FIG. 1 shows a heat detector 10 mounted to a ceiling 12 above a floor or ground surface 14. An operator P standing on the ground surface 14 holds the handle end 16 of an extension pole 20. The opposite end of the extension has a holder 18, which is shown in greater detail in FIGS. 2 and 3. The extension 20, as better seen in FIG. 2, is a tube of a lightweight material such as poly vinyl chloride (PVC) plastic or aluminum. The holder 18 is cup shaped with a cylindrical or frustro-conical wall 22 and a cup bottom 24. A retainer ring 26 is dimensioned to make a press fit with the cup wall 22, such that the ring, once pressed into the cup 18, is held therein by frictional engagement with the cup wall. The cup 18 is swiveled to a mount 28, as better seen in FIG. 3. The swivel mounting includes a pair of ears 32 which extend from the underside of the cup 18, and cross bolt 34 which passes through aligned holes in the ears and the upper end 36 of the mount 28. The bottom portion of the mount 28 has a diameter sized to make a close sliding fit into the open end 38 of the extension pole 20. The upper portion 36 is of somewhat enlarged diameter so as to define an annular shoulder 42 which serves as a stop against the end of the extension pole 20 when the mount 28 is inserted into the end 38 of the pole. The two ears 32 are normally tightened against the mount 28 by means of a wing nut 44 on the bolt 34 to keep the cup from moving relative to the extension pole 20.

A package 40 contains a powdered composition formulated to react exothermically upon exposure to ambient air. Such compositions are known and widely used as body warmers. Heating pads containing such compositions are inserted in shoes or mittens for warming the extremities during outdoor activities in cold climates, such as skiing. These exothermic compositions generally rely on the heat generated by air oxidation of granulated or powdered iron metal. An improved exothermic formulation of this type is described in U.S. Pat. No. 4,649,895 issued to Yasuki et al. Commercial versions of such exothermic powders are readily available and may contain a mixture of iron powder, water, salt, activated charcoal and vermiculite. For body warming applications these compositions are typically packaged in an inner air-permeable envelope to make a rectangular pad, which in turn is contained in an air-tight outer envelope. One such product suitable for use in the present invention is sold as "The Foot Warm-up " by Heatmax, Inc. of Dalton, Ga. As supplied by the manufacturer, this product is intended for use as a foot warmer and is said to maintain temperatures of about 100 degrees Fahrenheit, 110 Fahrenheit maximum, for up to six hours when used according to instructions on the package. These heating packs are intended to be used in a confined environment closed to free air circulation, such as the inside of a shoe or a glove, to avoid generation of excessive temperatures which might result in an open air environment. Purchasers are specifically cautioned to avoid use of the pack in a manner where excessive air flow might reach the heat pad. When exposed to free air flow in ambient air, the temperature of these heat pads may reach 165 degrees Fahrenheit.

The present invention provides a novel application for these heat packs in the testing of heat detectors. While the temperatures obtainable by air oxidation of heating packs are insufficient to trigger high and very high temperature heat detectors, they are entirely adequate for triggering heat detectors in the Low and the Ordinary temperature classifications. The Ordinary class of heat detectors encompasses the great majority of heat detectors in current use, covering the temperature range of 135 to 174 degrees Fahrenheit. In addition, rate of rise and rate compensation type heat detectors respond to rapid temperature increases, rather than any absolute temperature level, and consequently applying a source of heat to a rate of rise or rate compensation detector at room temperature normally suffices to activate the heat detector, even though the heat source may not be at a high absolute temperature.

According to the method of this invention, a heating pack 40 is placed in the holder 18 and is secured in place by pressing the retainer ring 26 into the cup, in spaced relationship to the cup bottom 24 so that the package 40 is held between the ring 26 and the bottom 24, as shown in FIG. 3. The cup wall 22 encompasses and partially shields the package 40 against ambient air currents and the free flow of ambient air as the package is transported to and from each detector. This partial shielding of the exothermic composition in the heating package 40 prolongs the heating time obtainable from a particular pack 40, while reducing somewhat the maximum temperature developed by the package. The pack 40 nonetheless easily reaches the 135 degree temperature rating of the Ordinary class of heat detector. It has been found that a good quality foot warmer pack, such as the commercial product identified above, when installed in the holder 18 of the extension 20, and used according to the method disclosed herein, will maintain the elevated temperature needed to test heat detectors rated at 135 degrees Fahrenheit for twenty to thirty minutes. This length of time may vary with variations in the particular formulation of the exothermic composition which may change somewhat from one supplier to another, with ambient temperature, prevailing air currents, and the handling of the extension 20 by a particular operator. Nonetheless, at a minimum, a heating pack 40 containing an exothermic composition based on air oxidation of iron will sustain a sufficient temperature for at least a few minutes and usually considerably longer than that, a period quite adequate for testing at least a few heat detectors. Large installations consisting of dozens of heat detectors may require the use of two or more heat packs 40.

The extension 20 is made up of one or more sections 54. The sections may be joined end-to-end by couplers 56, as needed to make up a length of the extension 20 sufficient to reach the heat detector 10 while standing on the ground surface 14. Each section 54 may be about two feet long, for example.

Once the heat pack 40 is placed and secured in the holder 18, and after the exothermic composition 48 has reached a sufficient operating temperature, the extension 20 is raised by an operator P, as shown in FIG. 1, to bring the heat pack 40 in the holder 18 into close proximity to or contact with the heat detector 10 under test. Typically, the rim 52 of the open end of cup 18 can be placed against the underside of the heat detector 10, as an aid to steadying the heat pack 40 in position under the heat sensing element of the detector 10. Depending on the construction of the particular heat detector, the heat sensing portion 11 of the detector can be received in the cup 18 and brought into physical contact with the heat pack 40, although actual contact is not essential to the proper testing of the detector 10. Close proximity of about one inch or less will normally suffice to set off the heat detector within a short time interval. Typically, a heat detector 10 with a 135 degrees Fahrenheit rating will respond within a few seconds to the contact or close proximity of the activated heat pack 40 of its sensing element 11. Proper operation of the detector 10 will be normally confirmed by actuation of an indicator lamp on a control panel of the fire alarm installation or by actual triggering of an alarm. If no such indication is obtained within an appropriate period of time, the detector 10 should be suspected of being defective, calling for closer inspection or replacement.

Almost all heat detectors are mounted to a ceiling surface. Occasionally, heat detectors are mounted to a wall surface, close to the ceiling, when a ceiling mounting is not possible or practical. In order to facilitate the testing of wall mounted heat detectors, the holder cup 18 can be swiveled as much as 90 degrees from the position shown in FIGS. 2 and 3 so that the open end of the cup faces at an angle to the extension 20. The interior of the holder cup 18 can then be oriented towards a wall surface with the extension 20 held in a generally vertical position, to facilitate application of the heat pack 40 to a wall mounted heat detector. The cup 18 can be fixed in either its upright, illustrated position or a side-looking position by loosening and tightening the nut 44.

Heating packs containing exothermic compositions of this type are ideally suited for the testing of heat detectors as compared to most any other source of heat. The heating packs are small, lightweight, entirely self-contained and require no electrical power supply, whether via an extension cord or batteries. The exothermic reaction is started simply by opening the outer envelope to admit ambient air into contact with the exothermic composition, so that no open flame is needed nor generated at any time in the process. The maximum temperature reached by the exothermic composition is self-limiting at a level which is generally safe for the equipment being tested and unlikely to damage plastic housings or other components of the heat detectors even when brought into direct contact with the heat pack. Each heating pack sustains a relatively steady operating temperature for a period of time generally sufficient for testing several and possibly many heat detectors, depending on the ease of access to each unit and the efficiency of the operator. Furthermore, the maximum temperature developed by the heating pack 40 when used according to this invention will not greatly exceed the temperature rating of the heat detector under test, no more than 10 or 20% in the case of 135 degree rated detectors. This limitation is especially important in the testing of heat detectors which include fixed temperature sensors of the fusible type. Application of excessive heat for prolonged periods of time to such detectors would cause the fusible element to melt, requiring replacement of the detector. In such cases it is important to apply controlled heat sufficient to properly test the reusable portion of the detector without reaching the temperature rating of any non-reusable sensing elements of the detector. It should be noted that even were this to occur, it will not be possible to re-set the fire alarm system back to its normal stand-by condition if a heat detector remains in alarm mode, requiring replacement of the activated detector. This provides a safety factor against inadvertently triggering a single use heat detector.

The heat packs are inexpensive, and the cost of heat packs needed for testing any particular installation is almost negligible in a commercial context. The used heat packs are ecologically benign, and can be safely discarded without hazard to humans or the environment. The heat packs in their original air-tight seal have a shelf life of several years, and require no special storage considerations.

The operator P remains safely on the ground surface 14 at all times during the testing procedure, and can move efficiently from one detector 10 to another without need for climbing up and down step ladders while pulling up electrical power cords.

This application for such heat packs has not been previously envisioned by others, yet it provides a simple, safe and low cost solution to the problem of testing heat detectors.

Heat packs based on other types of exothermic compositions are also known, including reusable packs based on certain gels and used for medical applications. However, reusable packs are considerably more costly than the disposable body warmers based on air oxidation of iron, and require a rather cumbersome procedure between uses which makes them less desirable for testing of heat detectors. Nonetheless, the use of alternative types of heat packs including reusable heat packs in the manner disclosed above is considered to be within the scope of this invention.

It should be understood that a preferred embodiment has been described and illustrated for purposes of clarity and example only, and that various changes, modifications and substitutions can be made thereto without departing from the spirit and scope of the present invention as defined in the following claims.

What is claimed is:

1. A method for testing heat detectors mounted at an elevated location above a ground surface, comprising the steps of:

providing a package containing a composition formulated to react exothermically but non-flammably so as to sustain a temperature sufficient to activate the heat detectors under test for a period of at least a few minutes upon exposure to ambient air;

exposing the contents of the package to ambient air to initiate the exothermic reaction; and elevating the package into contact with or close proximity to each heat detector.

2. The method of claim 1 wherein said step of elevating comprises the steps of:

providing a substantially rigid extension having a handle end and a holder at an opposite end;

placing the package in said holder; and raising said extension to bring said holder with said package into close proximity to each heat detector while standing on the ground surface under the heat detector.

3. The method of claim 2 wherein said step of placing the package in said holder further comprises the step of securing the package to said holder to keep the package from falling away from the holder during said raising.

4. The method of claim 1 wherein said package includes an air tight envelope and said step of exposing comprises the step of opening said envelope.

5. Apparatus for testing heat detectors mounted at an elevated location above a ground surface, comprising:

an initially air tight package containing a composition formulated to react exothermically but non-flammably so as to sustain a temperature sufficient to activate the heat detectors under test for a period of at least a few minutes upon exposure to ambient air, said air tight package being adapted to be opened for initiating exothermic reaction of said composition; and an extension having a handle end and a holder for receiving said package at an opposite end, said extension being of sufficient length for reaching the heat detector while being held by an operator standing on the ground surface under the detector.

6. The apparatus of claim 5 wherein said composition includes finely powdered iron oxide and is formulated to sustain a temperature in the range of 110 to about 160 degrees Fahrenheit for at least a few minutes upon exposure to ambient air.

7. The apparatus of claim 5 wherein said holder further comprises retaining means operative for securing the package to said holder.

8. The apparatus of claim 5 wherein said holder is cup shaped with a cup bottom affixed to said extension and an open end defined by a cup wall, and means for securing said package within said cup.

9. The apparatus of claim 8 wherein said open end is circular and said cup shape has a frustro-cylindrical inner wall.

10. The apparatus of claim 8 wherein said means for securing comprise a retainer dimensioned to make a friction fit in said cup in spaced relationship to said bottom for containing said package therebetween.

11. The apparatus of claim 5 wherein said extension is a pole of relatively lightweight material.

12. The apparatus of claim 5 wherein said extension is made up of sections of relatively lightweight tubing separably joined together to make up said sufficient length.

13. The apparatus of claim 5 wherein said extension is at least two feet in length.

14. Apparatus for testing heat detectors mounted at an elevated location above a ground surface, comprising:

an initially air tight package adapted to being torn for admitting ambient air thereinto, said package containing a composition including finely powdered iron oxide and formulated to react exothermically and to sustain a temperature in the range of 110 to about 160 degrees Fahrenheit for at least a few minutes upon exposure to ambient air, said air tight package being adapted to be torn open for initiating exothermic reaction of said composition; and an extension at least two feet in length having a handle end and a holder at an opposite end, said holder being adapted to hold said package for lifting into contact or close proximity to said heat detector by an operator standing on said ground surface and holding said extension.

* * * * *